United States Patent [19]

Spengler

[11] 4,273,738
[45] Jun. 16, 1981

[54] METHOD AND APPARATUS FOR FORMING, AND TRIMMING, THREE-DIMENSIONAL WORK PIECES

[75] Inventor: Ernst M. Spengler, Heusenstamm, Fed. Rep. of Germany

[73] Assignee: Stanztechnik GmbH R & S, Bergen-Enkheim, Fed. Rep. of Germany

[21] Appl. No.: 965,745

[22] Filed: Dec. 4, 1978

[51] Int. Cl.³ .................. B29C 1/16; B29C 17/10; B26D 1/06
[52] U.S. Cl. ................................ 264/154; 72/446; 72/448; 83/17; 83/39; 83/456; 83/519; 83/639; 100/214; 100/280; 100/DIG. 18; 264/163; 264/292; 264/320; 425/193; 425/195; 425/196; 425/290; 425/298; 425/311; 425/313
[58] Field of Search .......... 425/289, 290, 298, 292, 425/301, 454, 310, 451.9, 450.1, 451.5, 451.6, 182, 185, 186, 190, 192, 193, 195, 411, 383, 398, 399, 406, 412, 416, 454, 414, 184, 196; 100/269 A, 283, 295, 270–272, DIG. 18, 214, 280; 264/138, 161, 163, 155, 156, 320, 339, 153, 154, 292; 72/446, 448

[56] References Cited

U.S. PATENT DOCUMENTS

| 131,898 | 10/1872 | Partz | 425/193 |
|---|---|---|---|
| 1,934,188 | 11/1933 | Goebel | 425/411 |
| 1,972,789 | 9/1934 | Newkirk | 264/153 |
| 3,060,507 | 10/1962 | Knowles | 264/163 |
| 3,174,722 | 3/1965 | Alm | 254/122 |
| 3,195,186 | 7/1965 | Gauban et al. | 425/451.9 |
| 3,210,806 | 10/1965 | Dodge | 264/163 |
| 3,273,203 | 9/1966 | Ross | 264/163 |
| 3,392,429 | 7/1968 | House | 425/298 |
| 3,444,275 | 5/1969 | Willett | 264/26 |
| 3,454,174 | 7/1969 | Nelson | 254/122 |
| 3,461,756 | 8/1969 | Mojonnier | 264/153 |
| 3,461,761 | 8/1969 | Mojonnier | 83/17 |
| 3,491,639 | 1/1970 | Hale et al. | 83/526 |
| 3,677,675 | 7/1972 | Brown | 425/193 |
| 3,799,721 | 3/1974 | Howard | 425/195 |
| 3,835,769 | 9/1974 | Petersen | 100/269 A |
| 3,841,142 | 10/1974 | Aisuta et al. | 100/DIG. 18 |
| 4,005,967 | 2/1977 | Ayres et al. | 425/451.9 |
| 4,018,551 | 4/1977 | Shuman | 425/DIG. 48 |
| 4,043,729 | 8/1977 | Paracchi | 425/398 |
| 4,063,477 | 12/1977 | Hantke | 83/386 |
| 4,078,463 | 3/1978 | Leonard et al. | 83/453 |
| 4,104,349 | 8/1978 | Hilgenberg | 264/155 |
| 4,104,941 | 8/1978 | Krueger | 83/139 |
| 4,106,379 | 8/1978 | Spengler | 83/171 |
| 4,106,885 | 8/1978 | Poncet | 425/451.9 |

FOREIGN PATENT DOCUMENTS

| 844857 | 6/1970 | Canada | 100/DIG. 18 |
|---|---|---|---|
| 1450455 | 7/1966 | France | 83/639 |
| 3947 | of 1910 | United Kingdom | 100/269 A |

Primary Examiner—W. E. Hoag
Attorney, Agent, or Firm—W. G. Fasse; D. F. Gould

[57] ABSTRACT

Three-dimensional work pieces, such as instrument panels or dashboards, are made of initially flat stock or of synthetic material such as a two-component foamable material. The tools of the present apparatus include upper and lower holding tools which are preferably simultaneously shaping tools, and cutting or trimming tools. The upper tools and the cutting or trimming tools may have a common support which is preferably exchangeably secured in a main frame. The shaping tools are moved into a first cooperating position relative to each other, whereby the work piece is formed into the desired shape. The shaping tools may then be locked in the shaping position or they may be moved into a second cooperating position to be rigidly locked in the second position. A tool support such as a table carried by a scissors lift frame is used for moving the shaping tools into the desired positions. The cutting or trimming is then performed by applying pressure to the respective tools. A curing time may be provided between the forming step and the cutting or trimming step.

18 Claims, 8 Drawing Figures

METHOD AND APPARATUS FOR FORMING, AND TRIMMING, THREE-DIMENSIONAL WORK PIECES

BACKGROUND OF THE INVENTION

The present invention relates to a method and apparatus for forming and trimming three-dimensional work pieces. The invention is especially suitable for the complete manufacture of complicated three-dimensional work pieces in a single apparatus wherein the forming step is followed by a stamping, cutting, or a trimming step, which takes place in a three-dimensional manner. By the term "three-dimensional work piece" as used herein is meant a work piece having a shape other than planar. The term "three-dimensional tool means" as used hereinafter means a member which when used with a suitable cooperating member is adapted to deform a sheet of material out of a planar configuration or to clamp an article which has been previously deformed into a non-planar configuration.

My U.S. Pat. No. 4,106,379 discloses an apparatus for trimming randomly, three-dimensionally shaped work pieces, wherein the work piece support means have openings through which the strip steel knives pass in the three directions of space, whereby the configuration of all individual knives and their movements provide a three-dimensional cutting or trimming. The apparatus of my U.S. Pat. No. 4,106,379 is not intended for also shaping a three-dimensional work piece in the same machine prior to the stamping, cutting or trimming.

U.S. Pat. No. 4,063,477 discloses an apparatus and method for cutting carpet. A stationary lower support and a vertically movable upper support hold a preshaped carpet in position for the cutting operation. Vertically movable first cutting means travel through the lower and upper support while the supports hold the preshaped carpet in position during the cutting. So-called non-vertical, second cutting means may cut portions of the preshaped carpet which extend in a direction other than the horizontal. Each knife in U.S. Pat. No. 4,063,477 even though it is held in an angular position relative to the horizontal, cuts only in a plane extending perpendicularly to the direction of knife movement. Besides, in this reference the support for the carpet is stationary and therefore the stroke for the cutting knives and for the downholder means must have a substantial length. Moreover, the support means in U.S. Pat. No. 4,063,477 are not relieved from the cutting pressure which may be rather substantial because the forces necessary for the cutting may be in the order of 10 tons or more. Since, in U.S. Pat. No. 4,063,477 the support for the preshaped carpet is stationary, not only the stroke for the cutting knives and for the downholder means must have a substantial length, also each cutting is accomplished only in a respective two-dimensional plane.

U.S. Pat. No. 3,491,639 describes an apparatus for perforating a tubular work piece. The support means for the tubular work piece are not liftable and the known apparatus is not suitable for forming material such as sheet metal or foamable synthetic material into a three-dimensional shape and thereafter providing the three-dimensional shape with trimmed inner and/or outer edges in the same apparatus.

OBJECTS OF THE INVENTION

In view of the above, it is the aim of the invention to achieve the following objects singly or in combination:

to provide a three-dimensionally effective method and apparatus for the holding and/or forming and trimming or cutting of three-dimensional work pieces, wherein the holding tool means may simultaneously be shaping and/or forming tool means which, together with the cutting tool means are mounted for easily exchanging these tool means against other similar tool means;

to perform the shaping, stamping and/or trimming of the three-dimensional work piece in the same apparatus;

to minimize the stroke length for the cutting power drive means by utilizing a scissors lift frame for lifting the lower die- or mold means into cooperation with the upper die- or mold means;

to operate the scissors lift frame by pneumatic or hydraulic means;

to lock the scissors lift frame in a position for cooperation with the upper tool means during the stamping or trimming operation whereby the stamping and/or trimming pressure is diverted from the scissors lift frame and introduced into the main frame structure of the apparatus;

to perform the shaping operation, which requires substantially less power than the cutting, stamping or trimming operation, by means of pneumatic piston cylinders or by means of a vacuum deformation;

to arrange the upper and/or lower tool means in an exchangeable frame structure which is preferably adjustable in its position;

to optimize the access opening or spacing between the upper and lower tool means for facilitating the work of the operator;

to move the lower tool means upwardly into the upper tool means thereby reducing the length of the working stroke of the piston cylinder drive means of the cutting tool means;

to operate the tool means with bellows cylinders whereby the deflation of the bellows cylinders is performed with a vacuum pump to increase the operating speed;

to provide the upper tool means with a substantially rigid inner mold or contour which is preferably supported in an exchangeable secondary frame; and to support the lower tool means on elastically yielding support elements to compensate for any tolerances that may exist between the upper and lower tool members or between the outer and inner tool members and support mold means.

SUMMARY OF THE INVENTION

According to the invention, there is provided a method for three-dimensionally cutting and/or three-dimensionally shaping and then three-dimensionally cutting or trimming a work piece in one and the same machine. For this purpose a work piece support which carries first three-dimensional tool means is moved against second three-dimensional tool means to thereby perform said three-dimensional shaping of a material introduced between said first and second three-dimensional tool means. At least one of the first and second three-dimensional tool means is maintained stationary during the three-dimensional shaping of the material into the three-dimensional work piece. Thereafter, the first and second three-dimensional tool means are rigidly locked in a fixed position relative to each other whereupon third tool means are moved through at least one of said first and/or second tool means for performing the three-dimensional cutting or trimming, whereby the tool support means for the lower tools are relieved from the trimming or cutting pressure.

According to the invention there is further provided an apparatus for performing the above method of this invention. Such apparatus comprises main frame means and first three-dimensional tool means which are operatively supported by a first tool support means in the main frame. Second three-dimensional tool means are operatively supported in the main frame by second tool support means. Moving means are arranged for advancing the first and second tool means relative to each other for holding and/or shaping the material into the three-dimensional work piece. Locking means are provided for locking the first and second tool means into a rigid position relative to each other. Third tool means, preferably in the form of cutting, stamping or trimming tools are arranged for moving through at least one of the first or second tool means to thereby perform the cutting or trimming operation when the first and second tool means are in a rigidly locked position, whereby the support means especially of the lower tool means are relieved from the cutting pressure which is introduced into the main frame through the locking means.

In a preferred embodiment the first three-dimensional tool means with their first tool support means form a lower tool structure which is movable relative to the second tool means which form with their respective second tool support means an upper tool structure. The first tool support means comprise a scissors lift frame for advancing the first, lower tool means upwardly against the second, upper tool means. The lower, first tool means form lower mold means for the material to be shaped while the second, upper tool means form a corresponding upper mold. The upper mold may be movable toward the lower mold. The third tool means which perform the cutting or trimming operation are preferably arranged for moving through the upper mold means and the cutting operation is performed when the lower mold means is rigidly locked into a fixed position relative to the upper mold and relative to the main frame, whereby the high pressures which are used for the cutting or trimming operation are introduced directly into the main frame structure, thus avoiding heavy loads on the scissors lift means. The scissors lift frame means make it possible to substantially reduce the length of the cutting or trimming work stroke.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE

Figure 1:
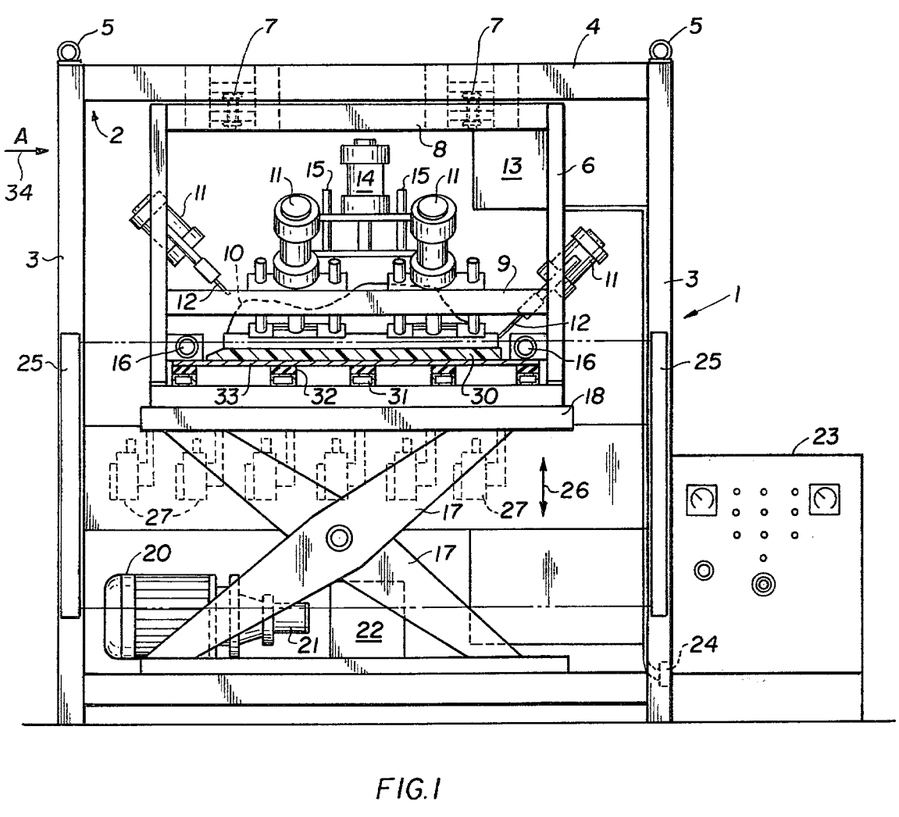
FIG. 1 is a simplified front view, partially in section of an apparatus according to the invention showing the scissors lift frame in a fully extended position.
Figure 4:
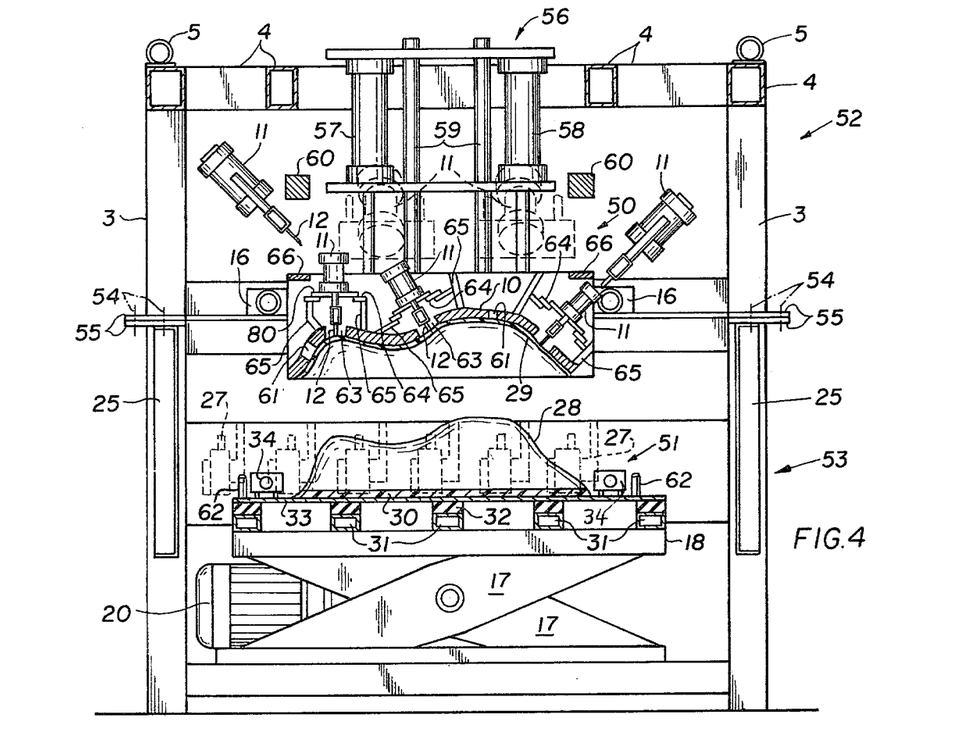
FIG. 4 is a view similar to that of FIG. 1, however, illustrating the scissors lift means in a lowered position, whereby the upper and lower tool means are disengaged from each other.

Referring to FIG. 1, the machine 1 comprises a main frame 2 having upright posts 3 and cross beams 4 interconnected, for example, by welding. The main frame 2 may comprise an upper section and a lower section interconnected by conventional means, for example, as shown in FIG. 4, whereby the upper frame portion may be lifted off the lower frame portion, for example, by connecting a crane hook to the eyes 5 for an easy exchange or retooling of the tool means.

A secondary frame 6 is adjustably and exchangeably secured to the cross beams 4 by screw adjustment means 7 operatively connected to the cross beam 4 by conventional means and to the secondary frame 6 which also comprises cross beam means 8 and upper tool support means 9 which carry an upper shaping tool 10 and cutting or trimming tools 11 with the respective knife 12 to be described in more detail below. Some of the cutting or trimming tools 11 may be operatively connected to the secondary frame 6 as shown and as described in more detail in my above mentioned U.S. Pat. No. 4,106,379. A connector box 13 for the required electrical connections may also be secured to the secondary frame 6. A hold down piston cylinder arrangement 14 with the respective guide rods 15 is also operatively supported in the secondary frame structure 6 for holding down the upper mold or forming tool 10.

The secondary frame 6 further comprises locking means 16 for locking the secondary frame 6 relative to the scissors lift frame 17 which is used according to the invention to lower and raise a lower tool support table 18 into a work piece shaping position as shown in FIG. 1. The scissors lift frame 17 is raised and lowered by means of a piston cylinder arrangement 19 shown in FIG. 2 and driven by a motor 20. The motor may drive a hydraulic or a pneumatic pump 21 which is operatively connected to the piston cylinder arrangement 19 by conventional means not shown. If the piston cylinder 19 is driven by hydraulic means, an oil container 22 may be arranged in the frame structure in a conventional manner.

A control panel 23 with electrical and pneumatic and/or hydraulic control levers is connected to the machine 1 by plug-in means 24 of the rapid connect and disconnect type well known in the art. Light barrier means 25 of conventional construction are arranged in such a position that the operator will be protected when he works with his hands in the zone through which the scissors frame lift means 17 will travel up and down in the direction of the arrow 26 as will be described in more detail below.

FIG. 1, showing a front view of the apparatus with the scissors lift frame 17 in the closed position, also shows a plurality of vacuum means 27 which are operatively connected to the upper mold 10 to hold a shaped work piece in the upper mold 10 when the lower mold 28 is in the lowered position as shown in FIG. 4. The details of the vacuum means which include the necessary exhaust pumps and conduits as well as valve means are not shown since they are well known in the art. The upper mold 10 is provided with holes connected to the suction conduit to hold the work piece 29, such as a dashboard, in position when the frame 17 is lowered as shown in FIG. 4.

FIG. 1 further shows an insert 30, which is, for example, made of TEFLON (RTM) in order to protect the knives 12 as the latter penetrate through the work piece 29.

The lower tool support table 18 comprises cross bars 31 which support through rubber elastic buffers 32 the insert 30 which may rest on a plate 33. These buffers permit holding the tool means substantially stationary but compensate for any unevenness in the work piece and for tolerances in the tool means.

Figure 2:
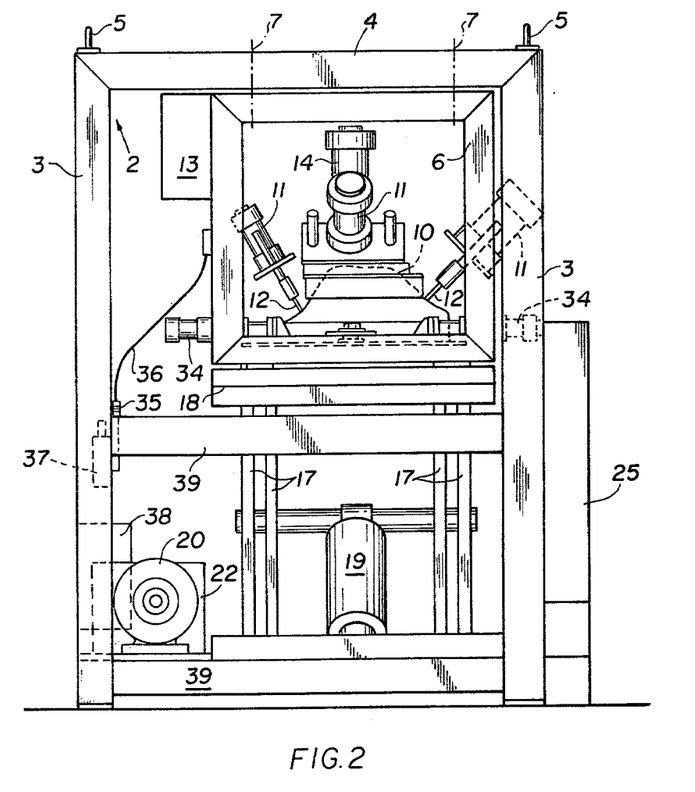
FIG. 2 is a view in the direction of the arrow A of FIG. 1 illustrating a side view of the present apparatus.

FIG. 2 shows a view in the direction of the arrow 34 in FIG. 1. The same reference numbers are employed for the same elements. FIG. 2 also shows locking piston cylinder means 34 which cooperate with the locking means 16 shown in FIG. 1 by moving a bolt into the holes provided in the locking means 16 which may comprise brackets rigidly secured to the secondary frame 6. When the bolts are moved by the piston cylinder 34 into the holes in the brackets 16, the scissors lift frame 17 is relieved from the stamping or trimming pressure, because these pressures are now directly introduced into the main frame structure.

A rapid disconnector and connector member 35 connects a pneumatic conduit 36 to the piston cylinder means 11 for operating the knives 12. The connector member 35 in turn is connected to pneumatic valve means 37 which may be part of the system which also includes the vacuum means 27. An electrical connector box 38 may also be secured to the main frame. However, its details are not disclosed since they are not part of the invention.

The main frame 2 may be strengthened by interconnecting the upright posts 3 by cross bars 39.

Figure 2A:
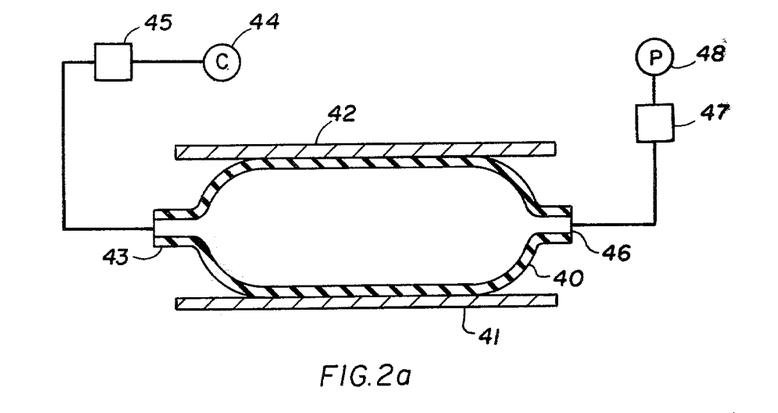
FIG. 2a illustrates a modification detail wherein a bellows cylinder is used for applying pressure to the cutting or trimming knives.

FIG. 2a illustrates a modification for the drive means of the cutting tools 11. Instead of conventional piston cylinder means as shown in FIG. 2 at 11, it is possible to employ bellows cylinders 40 of a flexible, rubber elastic type material which will expand sufficiently under pressure to perform the cutting strokes with the knives 12 which would be operatively connected to the pressure plate 41. The bellows is secured between the pressure plate 41 and a further confining plate 42 which is operatively connected to the secondary frame 6. The bellows cylinder 40 may be pressurized through an inlet port 43 connected to a compressor 44, preferably through suitable valve means 45. The bellows cylinder 40 is further provided with an exit port 46 connected through a suitable valve 47 to an exhaust pump 48, whereby the operational speed of the apparatus may be substantially increased.

Figure 3:
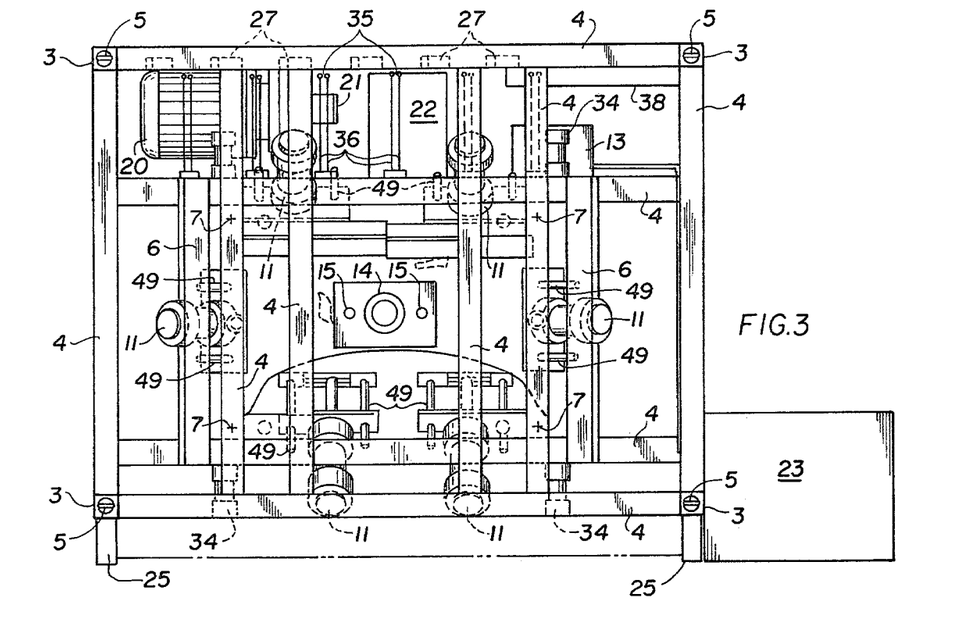
FIG. 3 is a top plan view of the apparatus according to FIGS. 1 and 2.

FIG. 3 is a top plan view of the apparatus shown in FIGS. 1 and 2 whereby again the same reference numbers are employed for the same elements. FIG. 3 shows that, for example, four locking piston cylinders 34 are employed for rigidly securing the position of the upper and lower tool means relative to each other and relative to the main frame. Further, the adjustment of the position of the secondary frame 6 relative to the main frame 2 is accomplished by four screw adjustment means 7.

Incidentally, all of the tool drive means 11 are provided with parallel guide rods 49 as best seen in FIG. 3.

FIG. 4 is a view similar to that of FIG. 1, however illustrating a modified embodiment of the invention and showing the upper tool means 50 separated from the lower tool means 51 because the scissors lift frame 17 is shown in the lowered position. In FIG. 4 the upper frame portion 52 constitutes a secondary frame and may be removed from the lower frame portion 53 upon removal of screw connections shown symbolically at 54. With the aid of these screw connections 54 required adjustments of the position of the upper frame member 52 relative to the lower frame member 53 may be made. For example, with the aid of elongated holes extending through the flanges 55 of the upper and lower frame members the latter may be adjusted.

The hold down mechanism 56 is also somewhat modified in FIG. 4 as compared to the similar member 14 in FIG. 1. The hold down mechanism 56 of FIG. 4 comprises two piston cylinder means 57 and 58 connected in parallel to each other and guided by parallel guide rods 59. Stop members 60 rigidly connected to the upper frame structure 52 limit the upper excursion of the upper tool means 50.

The upper tool means 50 comprises the mold 10 which is preferably provided with a plurality of suction holes 61 connected to the vacuum means 27 as mentioned above for holding the work piece 29 in position even if the lower mold 28 is in the lowermost position of the lower tool means 51. Incidentally, the lower mold 28 is preferably supported on the above mentioned knife protecting insert 30.

Guide pins 62 are provided on the lower support table 18 to fit into respective holes, not shown, in the upper tool means 50 so as to properly align the upper and lower tool means 50, 51. When the upper and lower tool means are properly aligned in the vertical direction, the piston cylinder means 34 drive the respective bolts into the holes of the locking brackets 16.

The cutting tools 11 form part of the upper tool means 50 and are operated after the work piece 29 has been shaped to assume the configuration of the upper mold 10 and the lower mold 28. The upper mold 10 is provided for this purpose with holes 63 through which the knives 12 may extend. The knives are not operated until the upper and lower tool means are locked with each other and with the main frame. Thus, the large cutting forces are transmitted directly into the main frame and need not be taken up by the scissors lift frame means 17. The angular position of the tool means 11 may be varied, for example, by washers 64 having different widths on both sides of the knife means, whereby the tool means are held in brackets 65 secured to support members 66.

Figure 7:
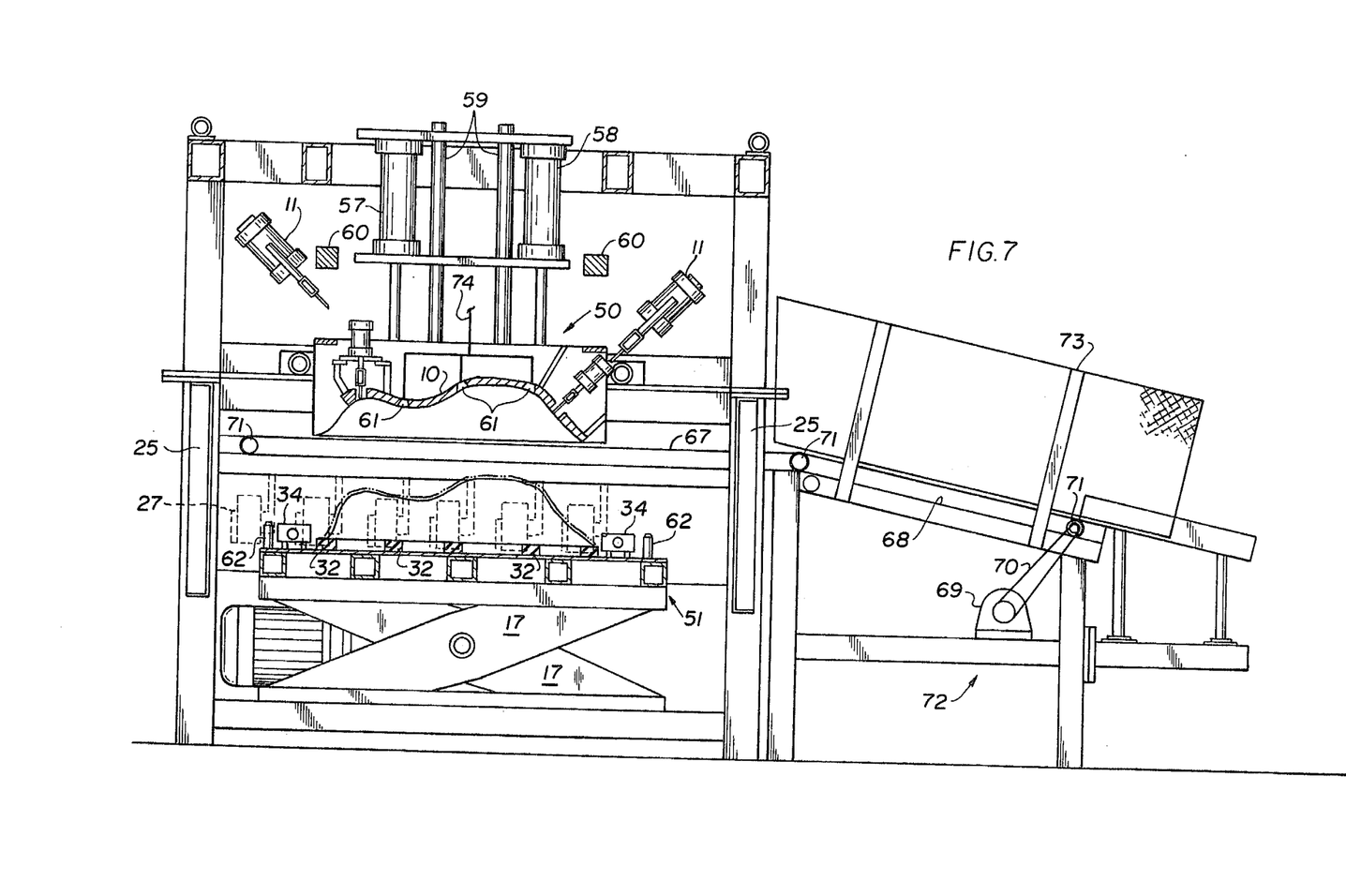
FIG. 7 is a view similar to that of FIG. 4, however, showing further details of means for the removal of the finished work pieces from the apparatus.

FIG. 7 is a view similar to that of FIG. 4, however, with the modification that the work pieces such as flat sections of carpet, may be moved into the space between the upper and lower tool means 50, 51 by conveyor means 67 and 68 driven by a motor 69 through power transmission means 70 such as a conventional chain drive or the like. The conveyors 67 and 68 are of conventional construction and hence not shown in detail. For example, spaced rubber strips or belts may run around pulleys 71. Prior to the stamping or cutting operation the conveyor 67 will be moved out of the space between the upper and lower tools by laterally removing the conveyors from the machine prior to closing the upper and lower tools and prior to operation of the cutting tools. The conveyor belts may be supported on a separate frame 72 provided with lateral guide walls 73 for guiding the work pieces onto the conveyor belt 67. FIG. 7 further shows that the suction holes 61 are connected to a conduit 74 which in turn is connected to the vacuum means 27.

Rather than using the conveyor means 67, 68 for the moving of work pieces into the machine, these conveyor means could be used for removing finished work pieces from the shaping and cutting apparatus, whereby the operator would insert the work pieces and after completion of the shaping and cutting or trimming activate the conveyor belts 67, 68 for the removal of the work piece.

Figures 5, 6:
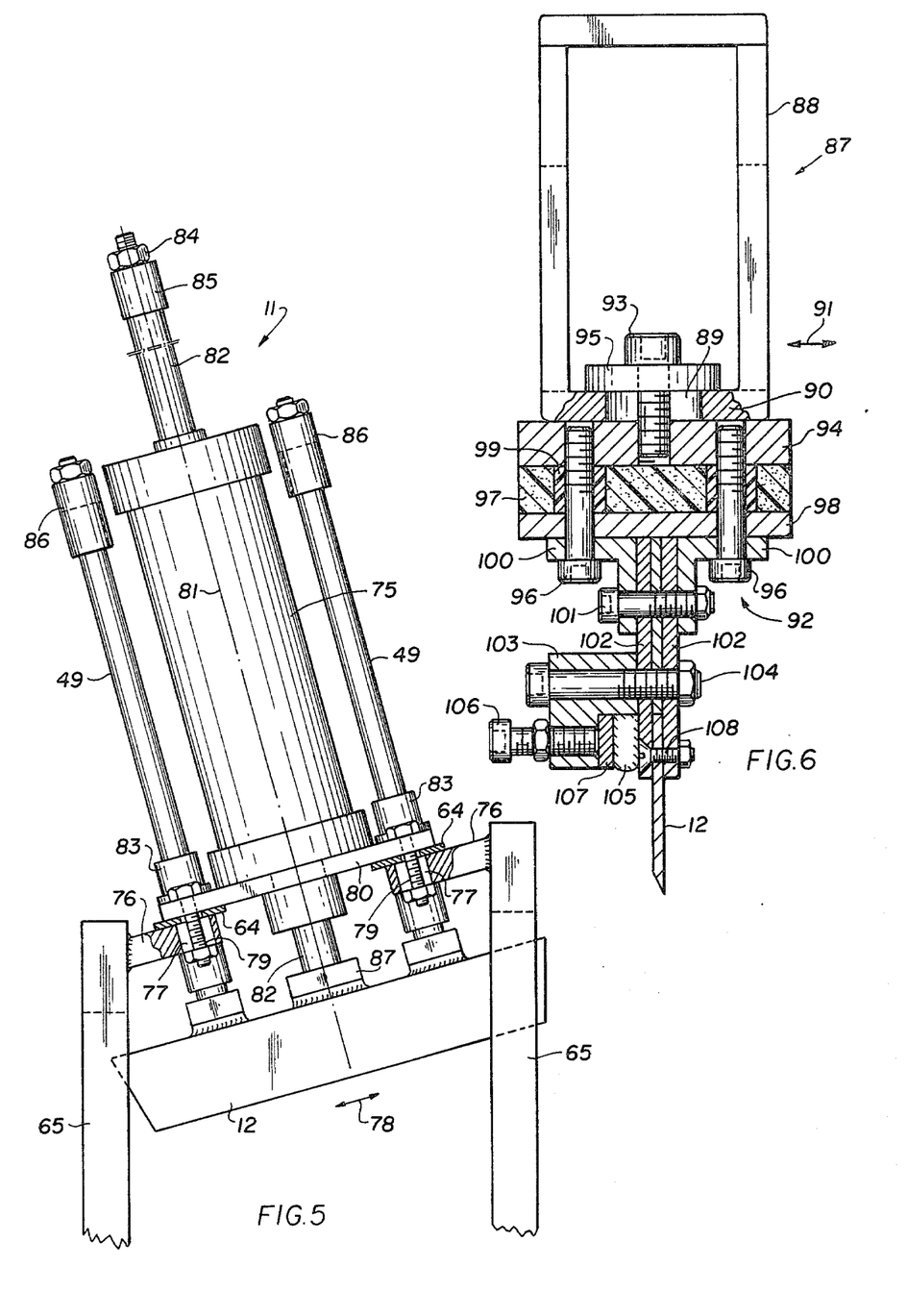
FIG. 5 shows a side view of a mounting for the cutting or trimming knives.
FIG. 6 illustrates a side view partially in section through further details of the knife mounting.

FIG. 5 illustrates one of the tool means 11. A power piston cylinder arrangement 75 is supported on the bracket 65 also shown in FIG. 4. For this purpose the brackets 65 are provided with extensions 76 having elongated holes 77 therein, whereby the tool means 11 may be adjusted in the direction of the double arrow 78 when the screws 79 are loosened. The screws 79 extend through a flange member 80 also shown in FIG. 4. The cylinder 75 is secured to the flange member 80. In order to slightly vary the angular position of the longitudinal axis 81 relative to the vertical, washers 64 are inserted between the flange member 80 and the bracket extensions 76. These washers may have a different thickness on one side as compared to the respective washer on the opposite side. These washers may also have a wedge shape for the just mentioned adjustment purpose. The brackets 65 are, for example, welded to the tool support 66 which in turn is secured to the piston rods of the hold down means 57, 58.

The parallel guide rods 49 for the piston rod 82 extend slidably through guide bearings 83 which are rigidly secured to the flange member 80. The piston stroke of the piston rod 82 is adjustable by adjustment screws 84 bearing against a synthetic rubber sleeve 85, for example, of polyamide which may cushion the work stroke of the knife 12. Similar adjustment means 86 are provided at the upper ends of the guide rods 49. The knife 12 may, for example, be welded to the guide rods 49 and to the piston rod 82, whereby the connecting means 87 may compensate for slight irregularities in the knives which are conventional strip steel knives.

Incidentally, the longitudinal holes 77 in the bracket extensions 76 may be provided by simply arranging the bracket extensions 76 in pairs so that two bracket extensions 76 extend in parallel to each other, whereby the entire structure 11 may be shifted back and forth as indicated by the double arrow 78, since the screws 79 would merely extend through the space between two parallel bracket extensions 76.

FIG. 6 illustrates the connection means 87 for securing a strip steel knife 12 to the lower end of the piston rod 82. The cage 88 is secured to the lower end of the piston rod 82 by conventional means. A hole 89 in the bottom plate 90 of the cage 88 permits a horizontal adjustment back and forth as shown by the arrow 91 of the lower connecting means 92 relative to the cage 88. Thus, by loosening the screw 93 the holding plate 94 may be shifted within the limits of the hole 89 for the adjustment of the knife position. The screw 93 is accessible through lateral holes in the cage 88. A washer 95 bridges the adjustment hole 89.

Screws 96 secure the knife holding elements to the holding plate 94 whereby a layer of high density elastic foam material 97 is sandwiched between the holding plate 94 and a further plate 98. Elastically yielding bushings 99 extend through the foam layer 97 to permit for the desired yielding. Holding angles 100 are held by the screws 96 against the further plate 98 to form a knife clamping gap in which the knife 12 is held by means of further screws 101 and clamping plates 102. A holding bracket 103 is secured to the clamping plates 102 by means of a screw 104 for securing an electrical heating element 105 to the clamping plates 102. The electrical heating element is easily exchanged by an adjustment means 106. A clamping insert 107 protects the heating element 105 for a more uniform pressure distribution along the length of the heating element 105. Aluminum screws 108 facilitate the heat transfer from the heating element 105 into the strip steel knife 12.

The advantages of the present invention are especially seen in the easy exchange of the secondary frame 6 with the tools attached thereto against another secondary frame carrying different tools. Similarly, in FIG. 4, the entire top portion or secondary frame 52 may be exchanged against another top portion carrying different tools as described. Further, the shaping of the material and the stamping as well as edge trimming is performed in a single machine. Due to the scissors lift frame 17 which brings the lower mold 28 into cooperating relationship with the upper mold 10, it is possible according to the invention to reduce the stroke length of the cutting knives 12 to a minimum. The lift frame 17 which may be operated hydraulically or pneumatically is locked in its end position by pneumatically operated piston cylinder means 34 which move a bolt into the locking brackets 16. Thus, the scissors lift frame is not required to take up the stamping and trimming pressure. The upper mold 10 may be pressed down by pneumatic cylinders such as 10 or 57, 58. However, the deformation of the work piece may also be accomplished by evacuation through the holes 61 when the molds are closed.

The above mentioned exchange of the secondary frame 6 may be accomplished by disconnecting all the electric, hydraulic, and/or pneumatic connections and the adjustment screws 7 whereupon the entire secondary frame 6 with the tools thereon may be lowered by the scissors lift frame 17. Preferably, when the secondary frame 6 rests on the lower support table 18, the locking means 16, 34 are engaged to securely hold the secondary frame 6 on the table 18. When the latter has reached the lowest position, the secondary frame with its tools may be removed out of the main frame and replaced by another secondary frame with different tools. The removal of the secondary frame may, for instance, be accomplished by a roller conveyor or the like.

Although scissors lift frames are normally not suitable for stamping operations due to the high stamping forces, the invention has accomplished the use of such scissors lift frames for stamping operations by relieving the lift frame from the stamping force with the aid of the locking means 16, 34. Depending on the size of the support table and on the type of work pieces to be shaped and stamped as well as trimmed, a plurality of locking devices may be arranged in order to take up stamping forces in the range of ten tons and more. Simultaneously, the scissors lift frame provides a large access opening thereby facilitating the work of the operator and reducing the stroke length of the cutting cylinder which permits the use of less expensive cylinders which, due to their shorter stroke are more precise and capable of a more rapid operation.

The use of the scissors lift frame according to the invention makes it even possible to employ bellows cylinders as shown in FIG. 2a for the piston cylinder drive means of the tool means 11. In order to increase the speed of operation where bellows cylinders are employed, they may be evacuated by a respective pump.

In order to accomplish the simultaneous deformation or shaping of the work pieces, the secondary frame carries a sturdy support member 66 for the upper tools including the upper mold 10 forming a precise counterpart for the lower mold 28. Thus, with the aid of the pressure applying means 14, 15 in FIG. 1, or 57, 58, 59 in FIG. 4 the deformations may be accomplished. As best seen in FIG. 4, the trimming tools 11 are also carried by the support 66 and the knives 12 do not interfere with the forming operation because during the forming operation the knives 12 are recessed in the holes 63 of the upper mold 10. During the work piece shaping operation the scissors lift frame 17 may take up a position half way between the stamping position and the fully lowered position. The power employed for the forming and shaping process is supplied either hydraulically or pneumatically by the hold down drives, for example, 57, 58. When the shaping of the work piece is completed, the scissors lift frame 17 may be used to further lift the upper and lower tool 50, 51 into a position wherein, upon proper positioning of the upper and/or lower tools, the locking means 34 may engage the locking brackets 16. In this position the upper tool means 50 also rest against the stop members 60 so that the upper tool means may not yield upwardly beyond a position defined by the stop members 60. When the upper and lower tool means are locked relative to each other the stamping tools 11 may be operated and the work piece is thus cut and/or trimmed in a three-dimensional manner.

Upon completion of the stamping and/or trimming operation the work piece 29 may be held in position as best seen in FIG. 4 by the above described suction means until a conveyor belt or the like 67 moves into the space below the upper tool means 50 whereupon the finished work piece may be dropped onto the conveyor 67 as best seen in FIG. 7.

By supporting the lower mold on rubber elastic buffers 32 it is possible to easily compensate for any tolerances that may be present in the inner and outer molds 28, 10.

The present apparatus is also suitable for the stamping of foamed work pieces. These foamed work pieces may be shaped in the present apparatus by first inserting the outer skin, for example, in the form of a polyethylene foil, whereupon the upper and lower molds are closed as described and a two component foaming material may be injected into the closed mold as is well known in the art. The outer skin in the closed mold prevents any material from escaping out of the mold. It is another advantage of the invention that only the inside shape of the work piece will be subject to tolerances and the outside shape of the three-dimensional work piece will assume the shape of the outer mold, whereby the configurations of the knives 12 will correspond exactly to the inner edges of the work piece to be trimmed. By supporting the work piece on the inside thereof, the outer shape and surface means for the work piece are not affected at all by the supporting of the work piece.

Further, the rubber buffers 32 also enable the lower mold to conform properly to the upper mold.

Although the invention has been described with reference to specific example embodiments, it will be appreciated, that it is intended to cover all modifications and equivalents within the scope of the appended claims.

What is claimed is:

1. A method for three-dimensionally cutting or trimming a three-dimensional work piece, comprising the steps of moving a work piece support which carries first three-dimensional tool means against second three-dimensional tool means to thereby securely hold a three-dimensional work piece introduced between said first and second three-dimensional tool means, maintaining at least one of said first and second three-dimensional tool means substantially stationary when the first and second three-dimensional tool means hold said three-dimensional work piece in a cutting or trimming position, then rigidly locking the first and second three-dimensional tool means in a fixed position relative to a main frame for introducing the cutting or trimming pressure into said main frame, then moving independent third tool means through at least one of said first and second tool means for performing said three-dimensional cutting or trimming along three-dimensionally extending contours, and supporting said second three-dimensional tool means and at least one of the independent third tool means including actuator means for said at least one independent third tool means on secondary frame means removably attached to said main frame in an exchangeable manner whereby the secondary frame means and the second and third tool means attached thereto are exchangeable as a unit for facilitating the retooling.

2. The method of claim 1, further comprising elastically holding the work piece on one side or surface and rigidly holding the work piece on the opposite side or surface of the work piece.

3. The method of claim 1, further comprising three-dimensionally shaping said work piece when said work piece support with its first three-dimensional tool means is moved against said second three-dimensional tool means and wherein said moving of said independent third tool means is delayed in time subsequent to said three-dimensional shaping, sufficiently for curing said three-dimensionally shaped work piece at least partially prior to said cutting or trimming by said independent third tool means.

4. The method of claim 1 or 3, wherein said moving of the work piece support is performed by means of a scissors lift frame.

5. The method of claim 1 or 3, wherein said moving of said independent third tool means is performed by pressurizing elastic bellows cylinder means.

6. The method of claim 3, wherein said first and second three-dimensional tool means are rigidly locked relative to each other and relative to the main frame during the work piece shaping for introducing the shaping pressure into the main frame.

7. The method of claim 3, wherein said first and second three-dimensional tool means are rigidly locked relative to each other and relative to said main frame for said cutting or trimming in a second position which differs from the first position in which the three-dimensional work piece shaping takes place for introducing the cutting force into the main frame.

8. The method of claim 7, comprising moving said work piece support means into said first position and then into said second position by means of a scissors lift frame.

9. An apparatus for cutting or trimming a three-dimensional work piece along three-dimensionally extending contours, comprising main frame means, first three-dimensional tool means, first tool support means operatively supporting said first three-dimensional tool means in said main frame means, second three-dimensional tool means, secondary frame means operatively and removably secured to said main frame means, second tool support means for operatively supporting said second three-dimensional tool means in said secondary frame means, drive means arranged for advancing said first and second three-dimensional tool means relative to each other for securely holding the work piece in a cutting or trimming position, locking means for locking said first and second three-dimensional tool means into a rigid position relative to said main frame means, independent third tool means, third tool support means operatively supporting at least one of said independent third tool means also on said secondary frame means and further drive means for said independent third tool means arranged for moving said independent third tool means through at least one of said first and second three-dimensional tool means to thereby perform said cutting or trimming when said first and second three-dimensional tool means are in said rigidly locked position, said further drive means for said at least one independent third tool means also being supported on said secondary frame means, whereby said removable secondary frame means with the second and third tool means supported thereon are exchangeable as a unit to facilitate the retooling of the apparatus, and whereby said locking means introduce the trimming or cutting pressure exerted by said further drive means into the main frame means thereby substantially relieving the first and second tool support means from said trimming or cutting pressure.

10. The apparatus of claim 9, further comprising means for adjustably securing said secondary frame means to said main frame means.

11. The apparatus of claim 9, wherein said locking means comprise a plurality of bolt means operatively secured to said main frame means, holes in said tool support means, and power operating means for moving said bolt means into and out of said holes, whereby said bolt means are taking up the cutting and trimming pressures to introduce the same into said main frame means.

12. The apparatus of claim 9, wherein said further drive means comprise elastic, expandable cylinder and pressure applying means, and compressor means operatively connected to said elastic, expandable cylinder means.

13. The apparatus of claim 9, wherein said first three-dimensional tool means constitute lower tool means and wherein said second three-dimensional tool means constitute upper tool means, said apparatus further comprising suction means operatively connected to said upper tool means for holding a three-dimensionally shaped work piece in said upper tool means.

14. The apparatus of claim 9, further comprising elastic means (32) operatively interposed between said main frame means and at least one of said tool support means, preferably the lower tool support means, for compensating tolerances between said first and second tool means and for also compensating unevennesses in said work piece, whereby the work piece is elastically held from one side thereof and rigidly held from the opposite side thereof.

15. The apparatus of claim 9, wherein said main frame means constitute a lower frame section, wherein said secondary frame means constitute an upper frame section, said apparatus further comprising means for adjustably and removably securing said lower and upper frame sections to each other.

16. The apparatus of claim 9, wherein one of said three-dimensional tool means constitutes an inner mold and the other of said three-dimensional tool means constitutes a corresponding outer mold, said apparatus further comprising elastic means (32) for operatively supporting said inner mold for limited yielding.

17. The apparatus of claim 9, wherein said first three-dimensional tool means constitute lower tool means for first three-dimensionally shaping said work piece into a three-dimensional work piece prior to said cutting and wherein said second three-dimensional tool means constitute upper tool means for said shaping, said first tool support means carrying said lower tool means and comprising a scissors lift frame for lifting said lower tool means, said second tool support means carrying said upper tool means on said removable secondary frame means.

18. The apparatus of claim 17, wherein said lower tool means and said upper tool means comprise cooperating work piece shaping means held by the respective tool support means, said third tool support means securing said independent third tool means in any desired position in said third tool support means, and holes in said upper work piece shaping means so located that said independent third tool means may move through a respective hole for the cutting and trimming operation, said independent third tool means being sufficiently recessed to avoid interfering with the shaping of the work piece.

* * * * *